United States Patent [19]

Yamaguchi et al.

[11] Patent Number: 4,740,858

[45] Date of Patent: Apr. 26, 1988

[54] ZERO-CURRENT ARC-SUPPRESSION DC CIRCUIT BREAKER

[75] Inventors: Satarou Yamaguchi, Tokyo; Hirohide Hirayama, Kobe, both of Japan

[73] Assignee: Mitsubishi Denki Kabushiki Kaisha, Japan

[21] Appl. No.: 893,286

[22] Filed: Aug. 5, 1986

[30] Foreign Application Priority Data

| | | | |
|---|---|---|---|
| Aug. 6, 1985 | [JP] | Japan | 60-171795 |
| Oct. 8, 1985 | [JP] | Japan | 60-222857 |
| Nov. 8, 1985 | [JP] | Japan | 60-250501 |
| Nov. 8, 1985 | [JP] | Japan | 60-250504 |

[51] Int. Cl.[4] ............ H02H 7/26

[52] U.S. Cl. ............ 361/4; 361/3

[58] Field of Search ............ 361/2–9, 361/93, 102, 56, 91, 13; 307/134, 135, 137, 138

[56] References Cited

U.S. PATENT DOCUMENTS

| | | | |
|---|---|---|---|
| 3,309,570 | 3/1967 | Goldberg | 361/6 X |
| 3,739,192 | 6/1973 | Oswald | 361/3 |
| 3,758,790 | 9/1973 | Kind et al. | 361/3 |
| 4,110,806 | 8/1978 | Morano et al. | 361/4 |
| 4,172,268 | 10/1979 | Yanabu et al. | 361/6 X |
| 4,305,107 | 12/1981 | Morano et al. | 361/4 |
| 4,442,469 | 4/1984 | Yanabu et al. | 361/2 X |
| 4,618,905 | 10/1986 | Tokuyama et al. | 361/13 X |
| 4,623,948 | 11/1986 | Volut | 361/13 |
| 4,636,906 | 1/1987 | Anderson et al. | 361/8 X |

FOREIGN PATENT DOCUMENTS

| | | |
|---|---|---|
| 0108279 | 5/1984 | European Pat. Off. . |
| 16-12533 | 7/1941 | Japan . |

*Primary Examiner*—J. R. Scott

*Assistant Examiner*—A. Jonathan Wysocki

*Attorney, Agent, or Firm*—Leydig, Voit & Mayer

[57] ABSTRACT

A zero-current arc-suppression circuit breaker arrangement having a series circuit including a capacitor power source previously charged and a switch connected in parallel with a series circuit formed of a circuit breaker and a diode. Upon operation, the capacitor power source provides a reverse current for reducing the current flowing to the circuit breaker to a zero-current level and the diode maintains the circuit breaker current at the zero-current level for a predetermined period of time. When the contacts of the circuit breaker are separated during this period, no arc plasma is generated to protect the circuit breaker from damage.

10 Claims, 5 Drawing Sheets

ZERO-CURRENT ARC-SUPPRESSION DC CIRCUIT BREAKER

BACKGROUND OF THE INVENTION

The present invention relates to a circuit for operating a D.C. circuit breaker and, more particularly, to a circuit for operating a D.C. circuit breaker for breaking when the instantaneous value of current flow to the circuit breaker is zero.

FIG. 1 is a schematic view of the construction of a prior art D.C. circuit breaker disclosed, for example, in Japanese Patent Publication No. 41-12533. In FIG. 1, numeral 1 designates a D.C. power source connected to a series circuit of a load 2 and a circuit breaker 3. Further, a series circuit of a switch 4, an inductor 5, and a power source 6 including a capacitor previously charged by a charging device (not shown), hereinafter referred to as "a capacitor power source", is connected in parallel with the circuit breaker 3.

FIG. 2 exemplifies a current waveform diagram of a current flowing to the circuit breaker 3 in a prior art example of FIG. 1 when a breaking operation is executed.

Assume now that the switch 4 is closed at time $t_1$ and that the circuit breaker 3 is to be opened simultaneously. Thus, a current flowing to the circuit breaker 3 changes to become zero at a time $t_2$ or at a time $t_2'$, depending upon the polarity of the capacitor power source. It is desirable to open the contacts of the circuit breaker 3 only when the current flowing thereto is substantially small and preferably zero (at either $t_2$ or $t_2'$). However, when the circuit breaker 3 fails to open at the time $t_2$ or $t_2'$, the initial interrupting operation of the circuit breaker 3 is repeated in the next cycle so as to open the contacts when the current flowing to the circuit creaker 3 becomes zero. The inductor 5 is provided to regulate a time constant for defining a period from the initial zero crossing point of the current flowing to the circit breaker 3 to the zero crossing point of the next cycle.

However, with this prior art D.C. circuit breaker arrangement, the current flowing to the D.C. circuit breaker quickly reduces to zero when a capacitor power source with reverse polarity (as compared to the D.C. power source) is used. Also, the time difference $(t_2-t_1)$ is short and insufficient to open the contacts due to physical and mechanical limitations of the circuit breaker. As a result, the contacts are often opened when the current flowing to the circuit breaker is not zero, thus generating an arc plasma between the electrodes (contacts) of the circuit breaker. Therefore, the operating life of the circuit breaker is drastically shortened and frequent replacement is required. Furthermore, there arises a problem that a reverse current flowing in the reverse direction at the next cycle makes it very difficult to determine the actual zero crossing point and, hence, the interruption operation of the circuit breaker becomes ineffective.

SUMMARY OF THE INVENTION

The present invention has as its objective to overcome the above-mentioned problems and, for its more particular object, to provide a circuit for operating a circuit breaker capable of preventing an arc plasma from being generated between the electrodes of the circuit breaker to extend its operating life and effectively opening the contacts when the current flowing therethrough is zero so that circuit breakers of small capacity can be used to interrupt large currents without damage.

BRIEF DESCRIPTION OF THE DRAWINGS

In the drawings, the same symbols indicate the same or corresponding parts.

DESCRIPTION OF THE PREFERRED EMBODIMENTS

Figure 1:
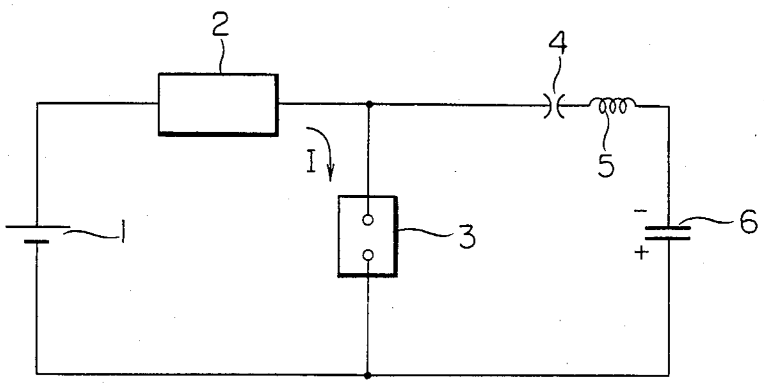
FIG. 1 PRIOR ART
FIG. 1 is a circuit diagram of a prior-art circuit for operating a D.C. circuit breaker.
Figure 2:
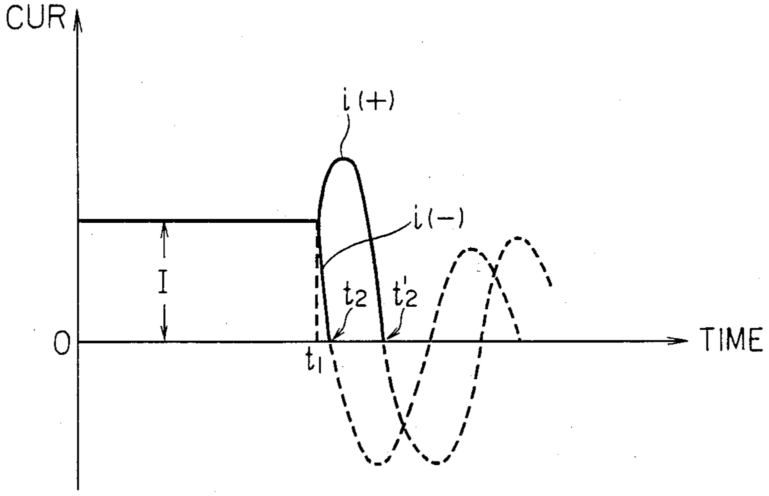
FIG. 2 PRIOR ART
FIG. 2 is a current waveform diagram of the breaker shown in FIG. 1.
Figure 3:
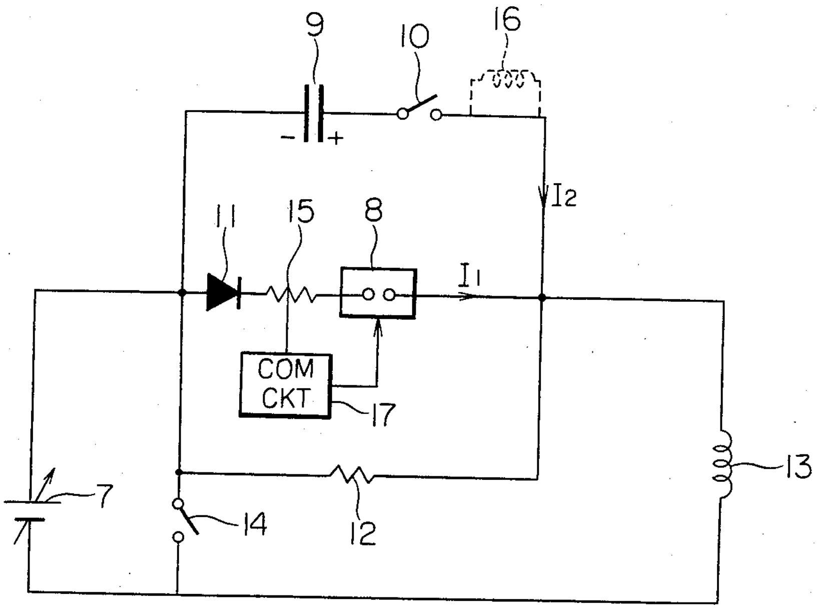
FIG. 3 is a circuit diagram of a circuit for operating a D.C. circuit breaker according to an embodiment of the present invention.
Figure 4:
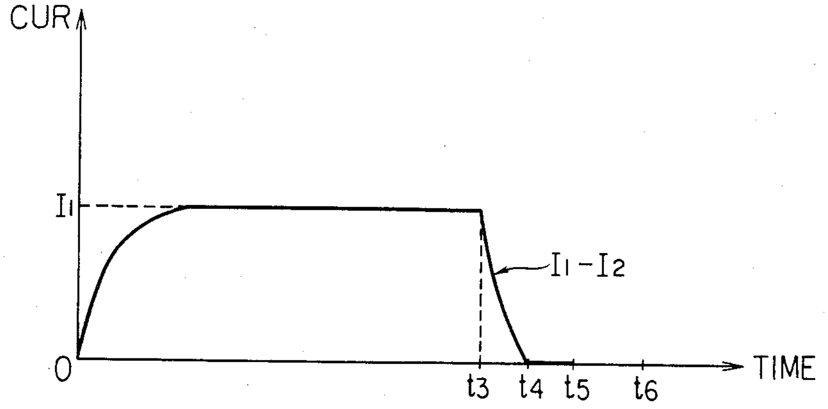
FIG. 4 is a current waveform diagram of the circuit breaker shown in FIG. 3.

Hereunder, embodiments of the present invention will be described with reference to the drawings. FIG. 3 is a schematic view of the construction of the embodiment, and FIG. 4 is a current waveform diagram of a circuit breaker in the embodiment.

In FIG. 3, numeral 7 designates a D.C. power source connected through a series circuit formed of a circuit breaker 8 and a diode 11 to a load coil 13. A commutation resistor 12 and a series circuit including a switch 10 and a previously charged capacitor power source 9 having a reverse voltage compared with the D.C. power source 7 are respectively connected in parallel with the series circuit of the circuit breaker 8 and the diode 11. A bypass switch 14 is part of a circuit including the commutation resistor, hereinafter referred to as an impedance, and is connected in parallel with the D.C. power source 7. A current sensor 15 is provided with respect to the series circuit of the circuit breaker 8 and the diode 11. An inductor 16 is inserted as required to the series circuit of the capacitor power source 9 and the switch 10.

Then, by referring to FIG. 4, the operation of the embodiment of the present invention shown in FIG. 3 will be described. The power source 7 is first operated to raise the current flowing to the load coil 13 to a constant value $(I_1)$. At this time, the current flowing to the load coil 13 and the current flowing to the circuit breaker 8 are substantially equal to one another. After a predetermined energy is held in the load coil 13 by this current, the bypass switch 14 is closed, the current flowing to the load coil 13 is bypassed by the bypass switch 14, and the power source 7 is disconnected from the circuit. Then, the switch 10 is closed at a time $t_3$, and a transient current $I_2$ starts flowing from the capacitor power source 9 to the circuit breaker 8 in a reverse direction to the current $I_1$. Thus, the difference between the currents $I_1$ and $I_2$ is set to zero, and the current change rate at this time is set to a range capable of being endured by the diode 11 connected in series with the circuit breaker 8, and the time difference between the times $t_4$ and $t_3$ is in general extremely short. It is noted that the diode 11 is connected in series with the circuit breaker so that the current flowing to the circuit breaker 8 does not become negative after time $t_4$. Rather, it is maintained at zero for an interval determined by the capacity of the capacitor power source 9 and the inductor 16. Also, the zero current transition interval is sensed by the current sensor 15 at the time $t_4$, an open command signal is generated from a command circuit 17 which, along with the current sensor 15, forms a command circuit means to open the contacts of the circuit breaker 8, and the circuit breaker 8 opens the contacts at a time $t_5$. Since no surrent flows to the circuit breaker 8 during this time period, an arc plasma is not generated between the electrodes. Further, since the capacitor power source 9 is not completely discharged until a time $t_6$, at which time the contacts of the circuit breaker 8 are already separated and the current flowing through the circuit breaker 8 is still zero, the arc plasma does not arise. Thus, a circuit breaker of small capacity can be safely and effectively utilized to interrupt large current by increasing the zero transition interval and by separating the contacts during this interval.

In the embodiment described above, a load coil 13 was used, but it is clear that the present invention is not limited to this particular embodiment. For example, the same advantages can be achieved when a load resistor is used in place of the load coil 13. Further, an inductor 16 may be provided in series with the capacitor power source 9 and the switch 10, as shown by a broken line in FIG. 3, when necessary to regulate a time constant with respect to the time required to completely discharge the capacitor power source 9.

As described above, the circuit for operating the D.C. circuit breaker according to this embodiment comprises a series circuit of the circuit breaker and the diode connected between the D.C. power source and the load and another series circuit of the capacitor power source and the switch connected in parallel with the previous series circuit. Thus, when the switch is closed, the current flowing to the circuit breaker becomes zero by the introduction of current flowing in a reverse direction from the capacitor power source, and this zero current is maintained for a transition interval by the arrangement of the diode and the capacity of the capacitor power source to provide sufficient time to separate the contacts of the circuit breaker to interrupt the circuit during this transition interval. Therefore, an arc plasma is not generated between the electrodes of the circuit breaker to increase its operational life expectancy and to allow the use of a circuit breaker of small capacity to interrupt large current without damage.

Figure 5:
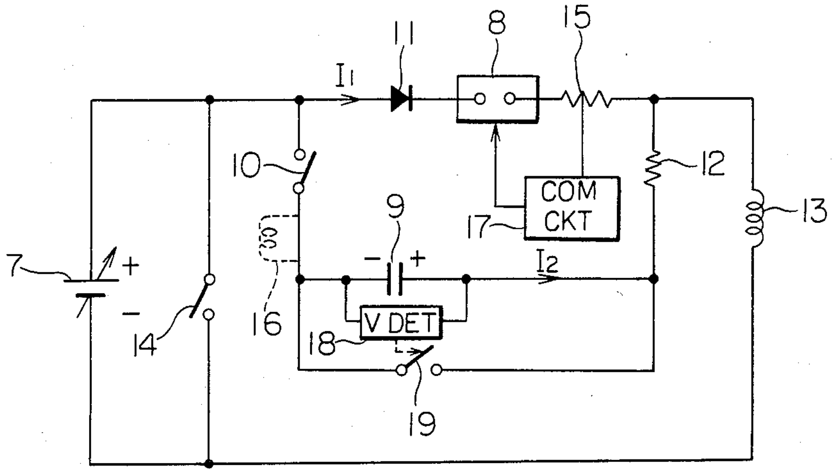
FIG. 5 is a circuit diagram of a circuit for operating a D.C. circuit breaker according to another embodiment of the present invention.

FIG. 5 shows another embodiment of the present invention. In FIG. 5, this embodiment is different from the previous embodiment in FIG. 3 in that the commutation resistor 12 is inserted in a discharge circuit formed of the capacitor power source 9, the switch 10, and a bypass switch 19. A voltage detector 18 is connected in parallel with the capacitor power source 9 to control the opening and closing of the bypass switch 19.

The other sections and the elements are the same as those in FIG. 3, and the description will be omitted.

Figure 6:
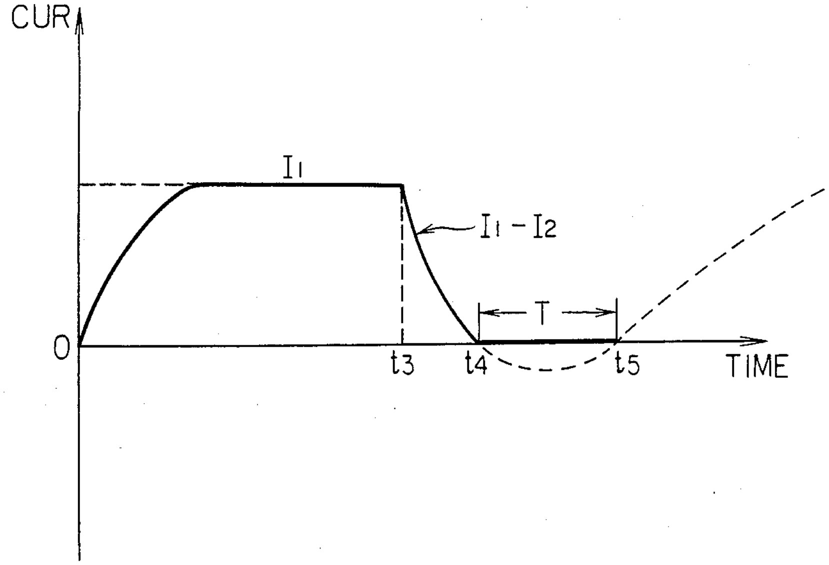
FIG. 6 is a current waveform diagram of the circuit breaker of FIG. 5.

By referring to FIG. 6, the operation of the embodiment in FIG. 5 will be described. The power source 7 is first connected to energize the load coil 13. When the current flowing to the load coil 13 through the diode 11 and the circuit breaker 8 is at a predetermined constant value $I_1$, by closing the bypass switch 14, the power source 7 is disconnected from the load coil 13. It is noted that the current flowing to the load coil 13 is equal to the current $I_1$ flowing to the circuit breaker 8 at this time, and energy is stored in the load coil 13.

Then, the switch 10 is closed at a time $t_3$ upon occurrence of trouble, and a reverse current $I_2$ flows from the capacitor power source 9 through the resistor 12 to the circuit breaker 8. The direction of the current $I_2$ is reverse compared to the current $I_1$ flowing to the circuit breaker 8, with the result that the combined circuit breaker current $I_1$-$I_2$) starts decreasing from the time $t_3$ and becomes zero at a time $t_4$. It is noted that, when the diode 11 is not inserted in series with the circuit breaker 8 and the circuit breaker 8 remains closed, the combined circuit breaker current becomes a negative value from the time $t_4$ to a time $t_5$, and again returns to zero at the time $t_5$ (shown by dotted line). However, in keeping with an aspect of the invention, the diode 11 is inserted to prevent the current from being inverted to maintain the zero current value over a period (T) (shown by solid line from $t_4$ to $t_5$) determined by the time constant of the charge/discharge circuit of the capacitor power source 9, which includes the inductor 16. This zero current value is detected by the current sensor 15, and an open command signal is generated from a command circuit 17 to open the contacts of the circuit breaker 8. Therefore, since no current flows to the circuit breaker 8 during this period T, no arc plasma is generated between the electrodes when the circuit breaker opened. Also, since the capacitor power source 9 is not completely discharged until the contacts of the circuit breaker 8 are widely separated, arc plasma can be eliminated, and the circuit breaker 8 can have high insulating withstand voltage. The operation up to this point is similar to that of FIG. 3.

On the other hand, when the circuit breaker 8 starts to open the contacts, the capacitor power source 9 tends to be charged reversely through the path of the commutation resistor 12, the load coil 13, the bypass switch 14, the switch 10, and, as required, the inductor 16. However, this reverse voltage of the capacitor power source 9 is detected by the voltage detector 18 so as to close the bypass switch 19 by transmitting the command signal to the bypass switch 19 before a large reverse voltage is generated. This, in turn, provides an alternate path to eliminate the reverse charge of the capacitor power source 9 and to attenuate the current through the commutation resistor 12.

In the embodiment described above, a load coil is used, but, like the embodiment of FIG. 3, the present invention is not limited to this particular embodiment. For example, the same advantages can also be achieved even when a load resistor is used. However, in this case, the resistor 12 becomes unnecessary and the inductor 16 may be removed to regulate the time constant.

Further, since the circuit breaker 8 mechanically moves to separate the electrodes, it takes a predetermined time from when an open command signal is generated to when the separation of the contacts actually takes place. As a result, the open command signal may be generated in advance independently from the zero current detection. In other words, when the open command signal is first applied to the circuit breaker 8 in response to the occurrence of trouble and the switch 10 may already be opened prior to the period from the time $t_3$ to the time $t_4$, the current sensor 15 is not necessary.

Figure 7:
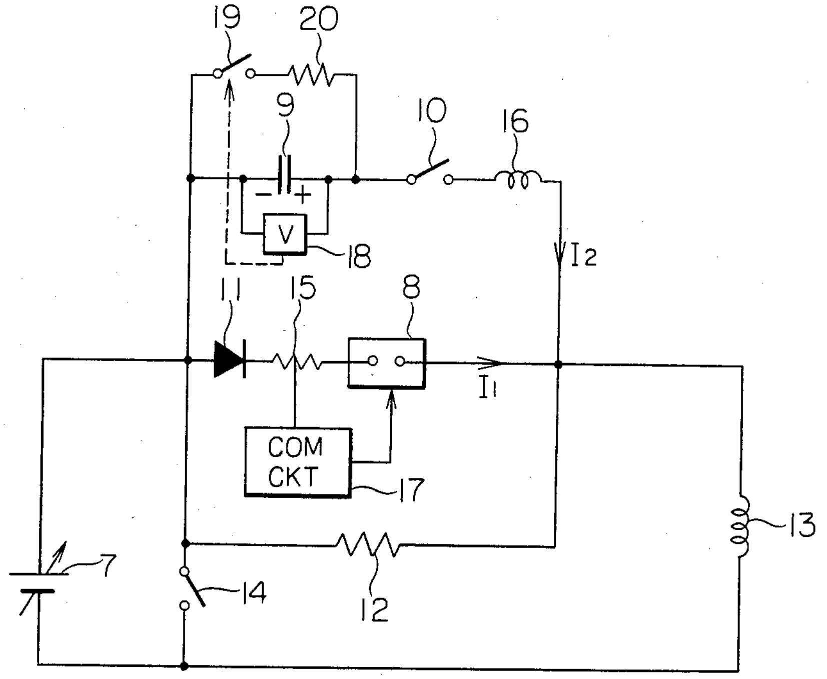
FIG. 7 is a circuit diagram of a circuit for operating a D.C. circuit breaker according to still another embodiment of the present invention.

FIG. 7 shows still another embodiment of the present invention. This embodiment differs from the embodiment shown in Fig. 3 in that a reverse voltage detector 18 is connected in parallel with the capacitor power source 9 and a series circuit including a discharge start switch 19 and a discharge resistor 20 is connected thereto. The voltage detector 18 detects when the capacitor power source 9 is excessively charged at a reverse voltage and generates a discharge command signal to control the opening and closing of the discharge start switch 19. The other sections and elements are the same as those in FIG. 3, and the description will be omitted.

Since the waveform diagram of the combined circuit breaker current according to the arrangement of FIG. 7 is fundamentally the same as that of FIG. 6, the operation of this embodiment will be described with reference to FIG. 6.

The D.C. power source 7 is first connected to energize the load coil 13. When the current flowing to the load coil 13 through the diode 11 and the circuit breaker 8 is at a predetermined constant value $I_1$, the power source 7 is disconnected from the load coil 13. It is noted that the current flowing to the load coil 13 is equal to the current $I_1$ flowing to the circuit breaker 8 at this time, and energy is stored in the load coil 13.

Then, the switch 10 is closed at a time $t_3$ upon occurrence of trouble, and a reverse current $I_2$ flows from the capacitor power source 9 through the resistor 12 to the circuit breaker 8. The direction of the current $I_2$ is reverse compared to the current $I_1$ flowing to the circuit breaker 8, with the result that combined circuit breaker current ($I_1$-$I_2$) starts decreasing from the time $t_3$ and becomes zero at a time $t_4$. It is noted that, when the diode 11 is not inserted in series with the circuit breaker 8 and the circuit breaker 8 remains closed, the combined circuit breaker current becomes a negative value from the time $t_4$ to the time $t_5$ and again returns to zero at the time $t_5$ (shown by dotted line). However, in keeping with an aspect of the invention, the diode 11 is inserted to prevent the current from being inverted to maintain the zero current value over a period (T) determined by the time constant of the charge/discharge circuit of the capacitor power source 9 (shown by the solid line from $t_4$ to $t_5$). This zero current value is detected by the current sensor 15, and an open command signal is generated from a command circuit 17 to open the contacts of the circuit breaker 8. Therefore, since no current flows to the circuit breaker 8 during this period T, no arc plasma is generated between the electrodes when the circuit breaker is opened. Also, since the capacitor power source 9 is not completely discharged until the contacts of the circuit breaker 8 are widely separated, arc plasma can be eliminated, and the circuit breaker 8 can have high insulating withstand voltage. The operation up to this point is similar to that in FIG. 3.

On the other hand, when the circuit breaker 8 starts to open the contacts, the capacitor power source 9 is charged reversely through the path of the resistor 12, the load coil 13, the bypass switch 14, the switch 10, and the inductor 16. However, when the reverse voltage of the capacitor power source 9 becomes excessive over the predetermined value, this reverse voltage of the capacitor power source 9 is detected by the reverse voltage detector 18 so as to close the discharge start switch 19 by transmitting the discharge command signal to the discharge start switch 19 before a large reverse voltage is generated to connect the discharge resistor 20 in parallel with the capacitor power source 9 to form a discharge path so that the capacitor power source 9 is not excessively reversely charged, and the current is attenuated through the commutation resistor 12.

In the embodiment described above, a load coil is used, but, like the embodiment of FIG. 3, the present invention is not limited to this particular embodiment. For example, the same advantages can be achieved even when a load resistor is used. However, in this case, the resistor 12 becomes unnecessary, and the inductor 16 may be removed to regulate the time constant since inductance is normally contained in the circuit.

Further, since the circuit breaker 8 mechanically moves to separate the electrodes, it takes a predetermined time from when an open command signal is generated to when the separation of the contacts actually takes place. As a result, the open command signal may be generated in advance, independently of the zero current detection. In other words, when the open command signal is first applied to the circuit breaker 8 in response to the occurrence of trouble and the switch 10 may already be opened prior to the period from the time $t_3$ to the time $t_4$, the current sensor 15 is not necessary.

Figure 8:
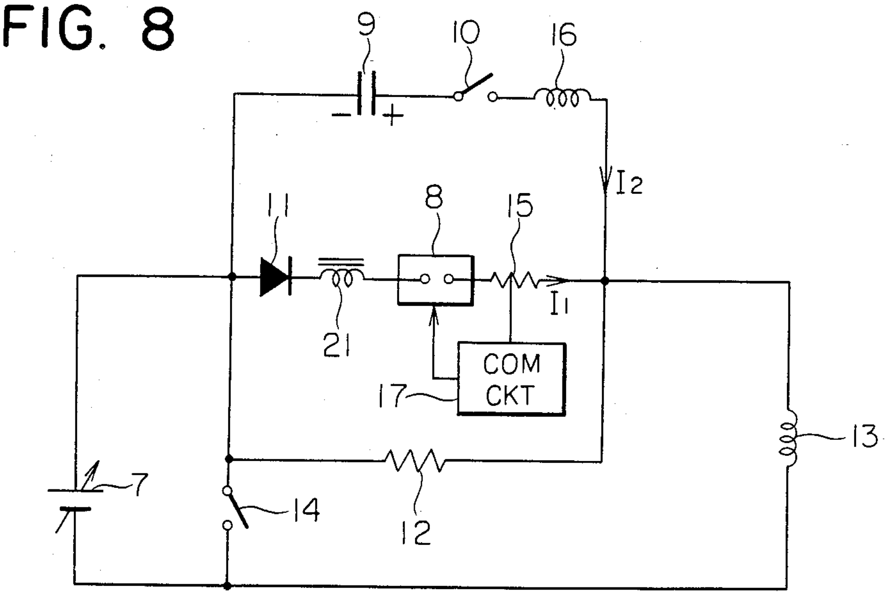
FIG. 8 is a circuit diagram of a circuit for operating a D.C. circuit breaker according to a modified embodiment of the present invention.

FIG. 8 shows a modified embodiment of the present invention. This embodiment differs from the embodiment shown in Fig. 3 in that a saturable reactor 21 is inserted into the series circuit having a circuit breaker 8 and diode 11. The other sections and elements are the same as those in FIG. 3, and the description will be omitted.

Then, by referring to FIG. 9, the operation of the emebodiment of FIG. 8 will be described.

The D.C. power source 7 is first connected to energize the load coil 13. When the current flowing to the load coil 13 through the diode 11 and the circuit breaker 8 is at a predetermined constant value $I_1$, the power source 7 is disconnected from the load coil 13. It is noted that the current flowing to the load coil 13 is equal to the current $I_1$ flowing to the circuit breaker 8 at this time, and energy is stored in the load coil 13.

Then, the switch 10 is closed at a time $t_3$ upon occurrence of trouble, and a reverse current $I_2$ flows from the capacitor power source 9 through the resistor 12 to the circuit breaker 8. The direction of the current $I_2$ is reversed compared to the current $I_1$ flowing to the circuit breaker 8, with the result that the combined circuit breaker current ($I_1$-$I_2$) starts decreasing from the time $t_3$ to a time $t_4$. However, as shown in FIG. 9, when the circuit breaker current becomes nearly zoer, i.e., at a time $t_4$, the saturable reactor 21 leaves its saturated state, and its inductance increases. Thus, the current change rate decreases, and the difference between the currents $I_1$ and $I_2$ only becomes zero at the time $t_5$.

Figure 9:
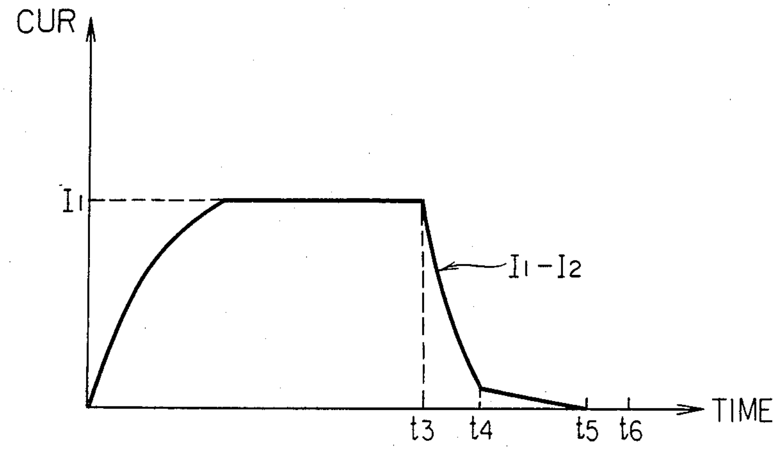
FIG. 9 is a current waveform diagram of the breaker shown in FIG. 8.

As apparent from FIG. 9, in the period from the time $t_4$ to the time $t_5$, the circuit breaker current is substantially zero, while in the period from the time $t_5$ when the circuit breaker current becomes zero to the time of the discharge finishing point $t_6$ of the capacitor power source 9, the circuit breaker current is zero.

In the embodiment described above, the circuit breaker current is detected by the current sensor 15 during both periods (when the circuit breaker current is zero and substantially zero), and a command signal is generated from the command circuit 17 to separate the contacts of the circuit breaker during these periods so that little or no arc plasma is generated.

Figure 10:
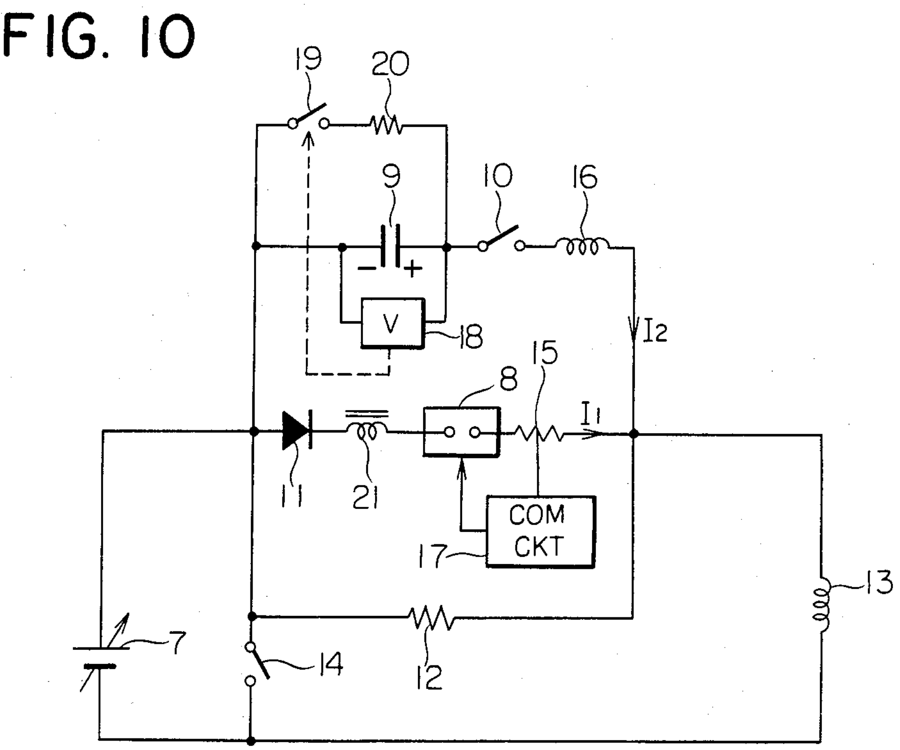
FIG. 10 is a circuit diagram of a circuit for operating a D.C. circuit breaker according to still another embodiment of the invention.

FIG. 10 shows still another embodiment of the present invention. In FIG. 10, in addition to the circuit arrangement shown in FIG. 9, a voltage detector 18 is connected in parallel with the capacitor power source 9 and a series circuit including a discharge start switch 19 and a discharge resistor 20. The voltage detector 18 detects excessive reverse voltage over a predetermined value of the capacitor power source 9 and generates a discharge command signal to close the discharge start switch 19 when the reverse voltage approaches the predetermined excessive value.

The operation of the circuit for operating the D.C. circuit breaker in FIG. 10 will be described. When the switch 10 is closed, the reverse current $I_2$ from the capacitor power source 9 flows through the inductor 16, the commutation resistor 12, the bypass switch 14, and even after the circuit breaker opens the contacts when the capacitor power source 9 starts charging reversely, the voltage detector 18 detects the predetermined excessive value and generates a discharge command signal so as to close the discharge start switch 19 to connect the discharge resistor 20 in parallel with the capacitor power source 9. As a result, unnecessary excessive voltage is prevented from being applied reversely to the capacitor power source with the use of the resistor 12.

In the embodiment described above, a load coil is used but, like the other embodiments, the present invention is not limited to this particular arrangement. For example, the same advantages can also be achieved even when a load resistor is used. However, in this case, the resistor 12 becomes unnecessary and the inductor 16 may be removed to regulate the time constant since the inductance is normally contained in the circuit.

Further, since the circuit breaker 8 mechanically moves to separate the electrodes, it takes a predetermined time from when an open command signal is generated to when the separation of the contacts actually takes place. As a result, the open command signal may be generated in advance, independently of the zero current detection. In other words, when the open command signal is first applied to the circuit breaker 8 in response to the occurrence of trouble, and the switch 10 may already be opened prior to the period from the time $t_3$ to the time $t_4$, the current sensor 15 is not necessary.

As described above, the circuit for operating the D.C. circuit breaker according to the arrangement in FIG. 8 comprises the saturable reactor inserted into the series circuit having the circuit breaker and the diode and between the D.C. power source and the load. Therefore, the current change rate becomes small near the zero point of the circuit breaker current by the saturable reactor to substantially extend the period of the zero current. Thus, when contacts of the circuit breaker are to be separated during this period, the breaking operation can be effectively performed so that large current can be interrupted by the use of circuit breakers of small capacity.

Further, in the embodiment of FIG. 10, after the contacts of the circuit breaker are separated, the capacitor power source starts reversely charging, and excessively large reverse voltage is then detected to close the discharge start switch. Thus, since the discharge path is provided in parallel with the capacitor power source, it can prevent the capacitor power source from overcharging reversely to prevent damage to the capacitor power source.

What is claimed is:

1. A zero-current arc-suppression circuit breaker arrangement which interrupts current from a D.C. power source to a load, said arrangement comprising:

a D.C. circuit breaker having separable contacts and connected between the D.C. power source and the load;

a bypass switch connected across the load for disconnecting the D.C. power source from the load;

a series circuit including a switch and a capacitor power source having a reverse voltage compared with the D.C. power source and connected in parallel with said D.C. circuit breaker to provide a reverse current for reducing current flowing through said separable contacts of said D.C. circuit breaker to a zero-current level when said switch is closed;

circuit means connected in series with said D.C. circuit breaker and said capacitor power source to prevent reverse current flow through said D.C. circuit breaker and to maintain current therethrough at the zero-current level for a predetermined time period; and command circuit means connected to detect the zero-current level of the circuit breaker current and to separate the separable contacts of said circuit breaker during said predetermined time period.

2. A zero-current arc-suppression circuit breaker arrangement according to claim 1 further including:

shorting means connected to said capacitor power source to provide a discharge path for eliminating the supply of reverse voltage to said capacitor power source from the load and to attenuate the current flowing through said circuit breaker.

3. A circuit breaker arrangement according to claim 1 wherein said command circuit means comprises a current sensor for detecting the circuit breaker current, and a command circuit for outputting an open command signal to said circuit breaker when said sensor detects the zero-current level of the circuit breaker current.

4. A circuit breaker arrangement according to claim 1 further including a voltage detector which generates a short command signal when detecting a capacitor power source reverse voltage larger than a predetermined value, and a bypass switch connected across said capacitor power source and closed by said short command signal.

5. A circuit breaker arrangement according to claim 1 further comprising:

means providing a discharge path for said capacitor power source upon detecting an excessively large reverse voltage compared with a predetermined value of said capacitor power source voltage.

6. A circuit breaker arrangement according to claim 5 wherein said command circuit means comprises a current sensor for detecting the circuit breaker current, and a command circuit for outputting an open command signal to said circuit breaker when said current sensor detects the zero-current level of the circuit breaker current.

7. A circuit breaker arrangement according to claim 5 wherein said means for producing a discharge path is connected across said capacitor power source, and comprises a reverse voltage detector which generates a discharge command signal of said capacitor power source when said excessively large reverse voltage is detected, and a series discharge start switch connected across said capacitor power source and closed by the discharge command signal and a discharge resistor.

8. A circuit breaker arrangement according to claim 1 wherein said command circuit means detects a substantially zero current flowing to said circuit breaker.

9. A circuit breaker arrangement according to claim 8 wherein said command circuit means comprises a current sensor for detecting circuit breaker current, and a command circuit for outputting an open command signal to said circuit breaker when said sensor detects the substantially zero-current flowing to said circuit breaker.

10. A circuit breaker arrangement according to claim 8 further comprising a saturable reactor connected in series with said D.C. circuit breaker.

* * * * *